United States Patent
Yamane et al.

(10) Patent No.: US 10,862,759 B2
(45) Date of Patent: Dec. 8, 2020

(54) COMMUNICATION NETWORK DETERMINATION APPARATUS, COMMUNICATION NETWORK DETERMINATION METHOD, AND RECORDING MEDIUM HAVING COMMUNICATION NETWORK DETERMINATION PROGRAM RECORDED THEREIN

(71) Applicant: NEC CORPORATION, Tokyo (JP)

(72) Inventors: Masato Yamane, Tokyo (JP); Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 29 days.

(21) Appl. No.: 16/312,428

(22) PCT Filed: Jun. 21, 2017

(86) PCT No.: PCT/JP2017/022815
§ 371 (c)(1),
(2) Date: Dec. 21, 2018

(87) PCT Pub. No.: WO2017/221969
PCT Pub. Date: Dec. 28, 2017

(65) Prior Publication Data
US 2019/0245752 A1    Aug. 8, 2019

(30) Foreign Application Priority Data
Jun. 23, 2016   (JP) .................................. 2016-124736

(51) Int. Cl.
*H04L 12/24*     (2006.01)
*H04L 12/26*     (2006.01)

(52) U.S. Cl.
CPC .......... *H04L 41/12* (2013.01); *H04L 43/0823* (2013.01); *H04L 43/12* (2013.01); *H04L 43/045* (2013.01)

(58) Field of Classification Search
None
See application file for complete search history.

(56) References Cited

U.S. PATENT DOCUMENTS 5,917,808 A *  6/1999  Kosbab ................. H04L 43/045
                                                     370/245
6,793,307 B2     9/2004  Spurr et al.
(Continued)

FOREIGN PATENT DOCUMENTS

CN    101494833 A    7/2009
CN    101548515 A    9/2009
(Continued)

OTHER PUBLICATIONS

"How to identify and resolve double-NAT problems." Posted at https://www.pcworld.com/article/3175739/how-to-identify-and-resolve-double-nat-problems.html on Mar. 1, 2017 (Year: 2017).*
(Continued)

*Primary Examiner* — Scott B Christensen
(74) *Attorney, Agent, or Firm* — Sughrue Mion, PLLC

(57) ABSTRACT

Provided is a communication network determination apparatus, etc. capable of correctly specifying a communication network which can be monitored by a monitoring device even when necessary and sufficient configuration information about the configuration of the communication network cannot be obtained. A communication network determination apparatus calculates a number of types of communication identifier associated with an apparatus identifier of a second information apparatus in monitoring information where a communication identifier allocated to a first information apparatus in a second communication network and (Continued)

an apparatus identifier of a second information apparatus that relays a communication in a first communication network, the monitoring information generated based on communication network via the first communication network; and determines that the first communication network is the same as the second communication network when the calculated number of types is one and determines that the first communication network is different from the second communication network, otherwise.

12 Claims, 16 Drawing Sheets

(56) References Cited

U.S. PATENT DOCUMENTS

| | | | |
|---|---|---|---|
| 2004/0057385 A1* | 3/2004 | Roshko | H04L 29/125 370/252 |
| 2006/0146792 A1* | 7/2006 | Ramachandran | H04L 12/6418 370/352 |
| 2006/0187912 A1* | 8/2006 | Schwartz | H04L 29/12009 370/389 |

FOREIGN PATENT DOCUMENTS

| | | |
|---|---|---|
| CN | 104052751 A | 9/2014 |
| JP | 2010-068152 A | 3/2010 |
| JP | 2013-046372 A | 3/2013 |
| JP | 2014-068293 A | 4/2014 |

OTHER PUBLICATIONS

JPO Office Action for Application No. 2016-124736 dated Mar. 6, 2018.

International Search Report for PCT/JP2017/022815 dated Sep. 26, 2017 [PCT/ISA/210].

Written Opinion for PCT/JP2017/022815 dated Sep. 26, 2017 [PCT/ISA/237].

First Office Action dated Sep. 22, 2020 from the China National Intellectual Property Administration in Application No. 201780039066.3.

* cited by examiner

MONITORING INFORMATION STORAGE UNIT

| TIME | COMMUNICATION ID | APPARATUS ID |
|---|---|---|
| 11:12:13 | 192.168.7.5 | 44:55:66:77:88:99 |
| 11:12:15 | | 12:34:56:78:90:AB |
| 11:12:15 | | EA:34:56:78:E0:53 |
| 11:12:15 | 192.168.7.1 | 66:55:44:33:22:11 |
| 11:12:16 | 1.2.3.4:80 | EA:34:56:78:E0:53 |

Fig.6

MONITORING INFORMATION STORAGE UNIT 202

| TIME | COMMUNICATION ID OF TRANSMISSION SOURCE | APPARATUS ID OF TRANSMISSION SOURCE | COMMUNICATION ID OF DESTINATION | APPARATUS ID OF DESTINATION | CONTENT INFORMATION |
|---|---|---|---|---|---|
| 11:12:13 | 192.168.7.5:137 | 44:55:66:77:88:99 | 192.168.7.255 | FF:FF:FF:FF:FF:FF | NetBIOS NameService |
| 11:12:15 | | 12:34:56:78:90:AB | | FF:FF:FF:FF:FF:FF | ARP Which has 192.168.7.254 |
| 11:12:15 | | EA:34:56:78:E0:53 | | 12:34:56:78:90:AB | ARP 192.168.7.254 is EA:34:56:78:E0:53 |
| 11:12:15 | 192.168.7.1:8546 | 66:55:44:33:22:11 | 1.2.3.4:80 | EA:34:56:78:E0:5 | GET / HTTP/1.1 |
| 11:12:16 | 1.2.3.4:80 | EA:34:56:78:E0:53 | 192.168.7.1:8564 | 66:55:44:33:22:11 | OK 200 <HTML><BODY> |

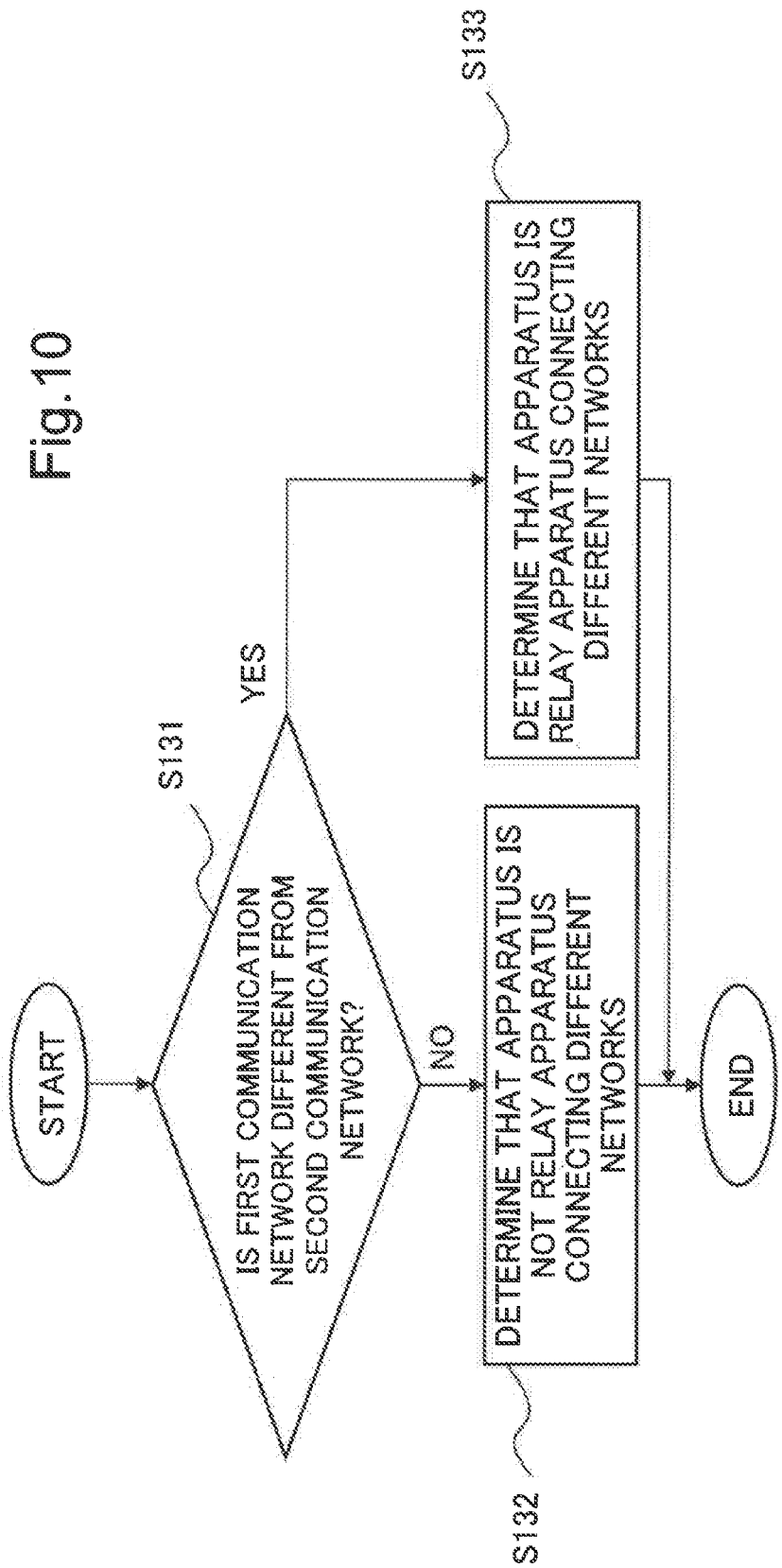

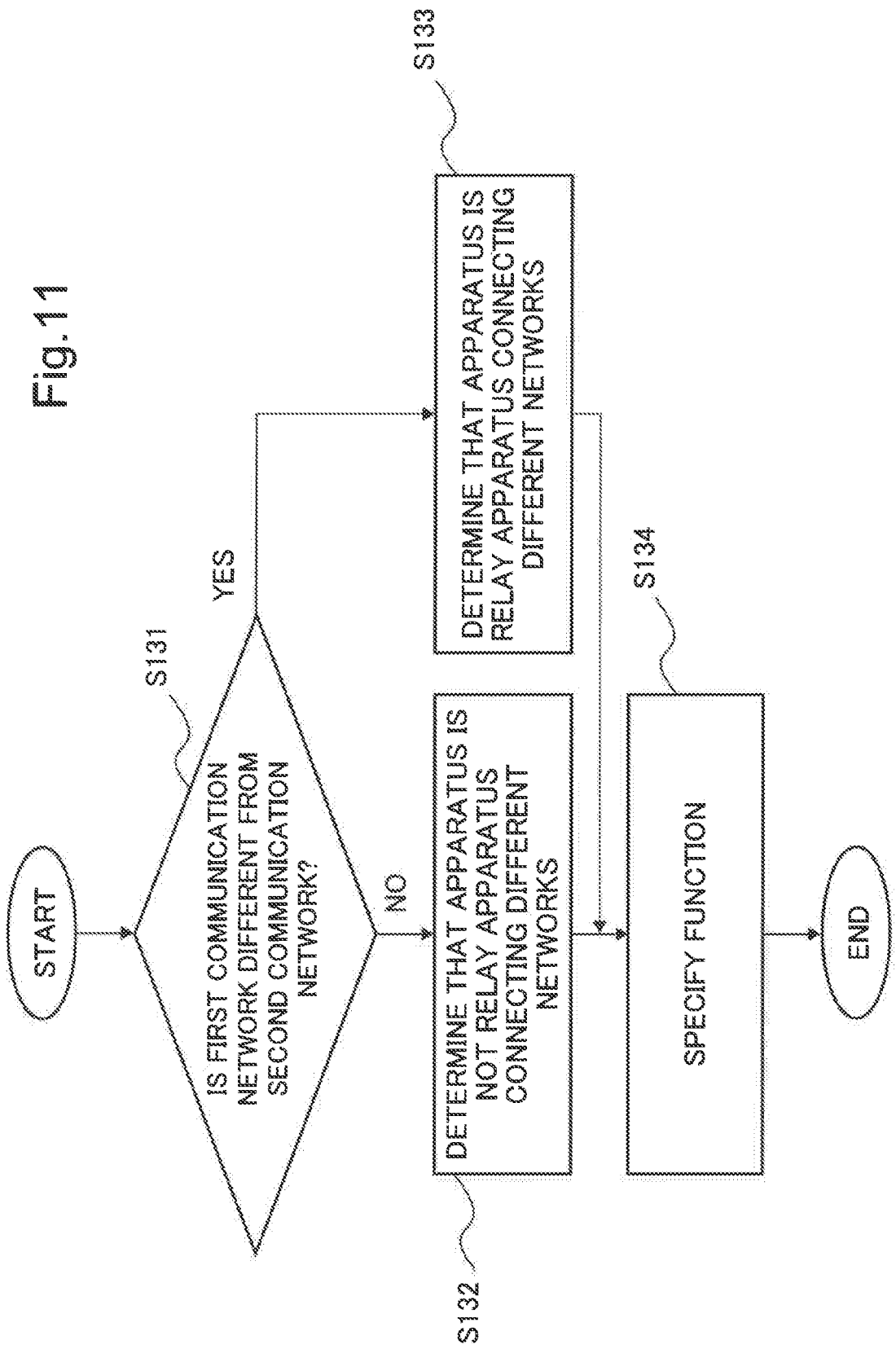

Fig.12

FUNCTION INFORMATION STORAGE UNIT 203

| TARGET | DETERMINATION CRITERIA | FUNCTION | |
|---|---|---|---|
| | | TRANSMISSION SOURCE | DESTINATION |
| PORT NUMBER OF DESTINATION | 8080 | Web PROXY CLIENT | Web PROXY SERVER |
| PORT NUMBER OF DESTINATION | 445 | File SHARING CLIENT | File SHARING CLIENT |
| PORT NUMBER OF DESTINATION | 80 | Web CLIENT | Web SERVER |
| CONTENT INFORMATION | "GET " | Web CLIENT | Web SERVER |
| CONTENT INFORMATION | "SSH" | SSH CLIENT | SSH SERVER |

Fig.13

| DISPLAY INFORMATION | |
|---|---|
| COMMUNICATION ID | FUNCTION |
| 192.168.7.1 | Web PROXY CLIENT |
| 192.168.7.254 | Web PROXY SERVER |
| 192.168.7.3 | File SHARING CLIENT |
| 192.168.7.253 | File SHARING SERVER |
| 192.168.7.2 | WEB PROXY CLIENT |

COMMUNICATION NETWORK DETERMINATION APPARATUS, COMMUNICATION NETWORK DETERMINATION METHOD, AND RECORDING MEDIUM HAVING COMMUNICATION NETWORK DETERMINATION PROGRAM RECORDED THEREIN

CROSS REFERENCE TO RELATED APPLICATIONS

This application is a National Stage of International Application No. PCT/JP2017/022815, filed on Jun. 21, 2017, which claims priority from Japanese Patent Application No. 2016-124736, filed on Jun. 23, 2016, the disclosures of all of which are incorporated herein in their entirety.

TECHNICAL FIELD

The present invention relates to a communication network determination apparatus and the like that determine a state of a communication network.

BACKGROUND ART

PTL 1 discloses a fault detection apparatus that detects, when a configuration of a communication network changes, a fault that has occurred in the communication network while following the change. The fault detection apparatus includes a trap acquisition unit, a configuration acquisition unit, a configuration prediction unit, and a fault probability table management unit. The trap acquisition unit acquires notification information indicating that a configuration of a communication network has changed. The configuration acquisition unit acquires, based on the notification information and the configuration of the communication network, a configuration of a communication network after the change. The configuration prediction unit determines a prediction configuration based on a redundancy configuration relating to the configuration. The redundancy configuration has been acquired from equipment included in the communication network. The fault probability table management unit estimates a fault point where a fault has occurred in the communication network based on a fault occurrence notification indicating a content of a fault, the configuration information, and a fault probability table indicating a probability of a cause point with respect to each content of the fault.

PTL 2 discloses a monitor apparatus that monitors facility equipment and information processing equipment in an energy management system. The monitor apparatus communicably connects to an energy system including information processing equipment, facility equipment, and a control apparatus that controls the facility equipment. The monitor apparatus acquires path information indicating a path in a first communication network to which the information processing equipment and the control apparatus connect. The monitor apparatus acquires path information indicating a path in a second communication network to which the facility equipment and the control apparatus connect. In this case, the first communication network is different from the second communication network in communication method. The monitor apparatus specifies, based on two pieces of path information, a connection relation among the information processing equipment, the facility equipment, and the control apparatus and outputs display information indicating the identified relation.

CITATION LIST

Patent Literature

PTL 1: Japanese Unexamined Patent Application Publication No. 2013-046372
PTL 2: Japanese Unexamined Patent Application Publication No. 2014-068293

SUMMARY OF INVENTION

Technical Problem

However, even when any one of the apparatuses disclosed in PTL 1 and PTL 2 is used, specification of a communication network is difficult in case that configuration information relating to a configuration in a communication network is not acquired necessarily and sufficiently. The reason is that even any of the apparatuses executes processing as described in Background Art, based on information relating to a configuration in a communication network.

One of objectives of the present invention is to provide a communication network determination apparatus and the like capable of accurately specifying a communication network monitorable by a monitor apparatus even when it is difficult to necessarily and sufficiently acquire configuration information relating to a configuration of a communication network.

Solution to Problem

As an aspect of the present invention, a communication network determination apparatus including:
calculation means for calculating a number of types of communication identifier associated with an apparatus identifier of a second information apparatus in monitoring information where a communication identifier allocated to a first information apparatus in a second communication network and an apparatus identifier of a second information apparatus that relays a communication in a first communication network, the monitoring information generated based on communication network via the first communication network; and
determination means for determining that the first communication network is the same as the second communication network when the calculated number of types is one, and determining that the first communication network is different from the second communication network when the calculated number of types is two or more.

In addition, as another aspect of the present invention, a communication network determination method including:
calculating a number of types of communication identifier associated with an apparatus identifier of a second information apparatus in monitoring information where a communication identifier allocated to a first information apparatus in a second communication network and an apparatus identifier of a second information apparatus that relays a communication in a first communication network, the monitoring information generated based on communication network via the first communication network; and
determining that the first communication network is the same as the second communication network when the calculated number of types is one, and determining that the first communication network is different from the second communication network when the calculated number of types is two or more.

In addition, as another aspect of the present invention, a communication network determination program makes a computer achieve:

a calculation function for calculating a number of types of communication identifier associated with an apparatus identifier of a second information apparatus in monitoring information where a communication identifier allocated to a first information apparatus in a second communication network and an apparatus identifier of a second information apparatus that relays a communication in a first communication network, the monitoring information generated based on communication network via the first communication network; and a determination function for determining that the first communication network is the same as the second communication network when the calculated number of types is one, and determining that the first communication network is different from the second communication network when the calculated number of types is two or more.

Furthermore, the object is also achieved by a computer-readable recording medium that records the program.

Advantageous Effects of Invention

With the communication network determination apparatus and the like according to the present invention, a communication network monitorable by a monitor apparatus can be accurately specified even when it is difficult to necessarily and sufficiently acquire configuration information relating to a configuration of a communication network.

BRIEF DESCRIPTION OF DRAWINGS

FIG. 3 is a diagram conceptually illustrating an example of monitoring information stored in a monitoring information storage unit.

FIG. 6 is a diagram conceptually illustrating an example of monitoring information stored in a monitoring information storage unit.

FIG. 10 is a flowchart illustrating a processing flow in the communication network determination apparatus according to the fourth example embodiment.

FIG. 11 is a flowchart illustrating a processing flow in the communication network determination apparatus according to the fourth example embodiment.

FIG. 12 is a diagram conceptually illustrating an example of function information stored in a function information storage unit.

FIG. 13 is a diagram conceptually illustrating an example of display information.

EXAMPLE EMBODIMENT

Next, example embodiments of the present invention are described in detail with reference to the drawings.

First Example Embodiment

Figure 1:
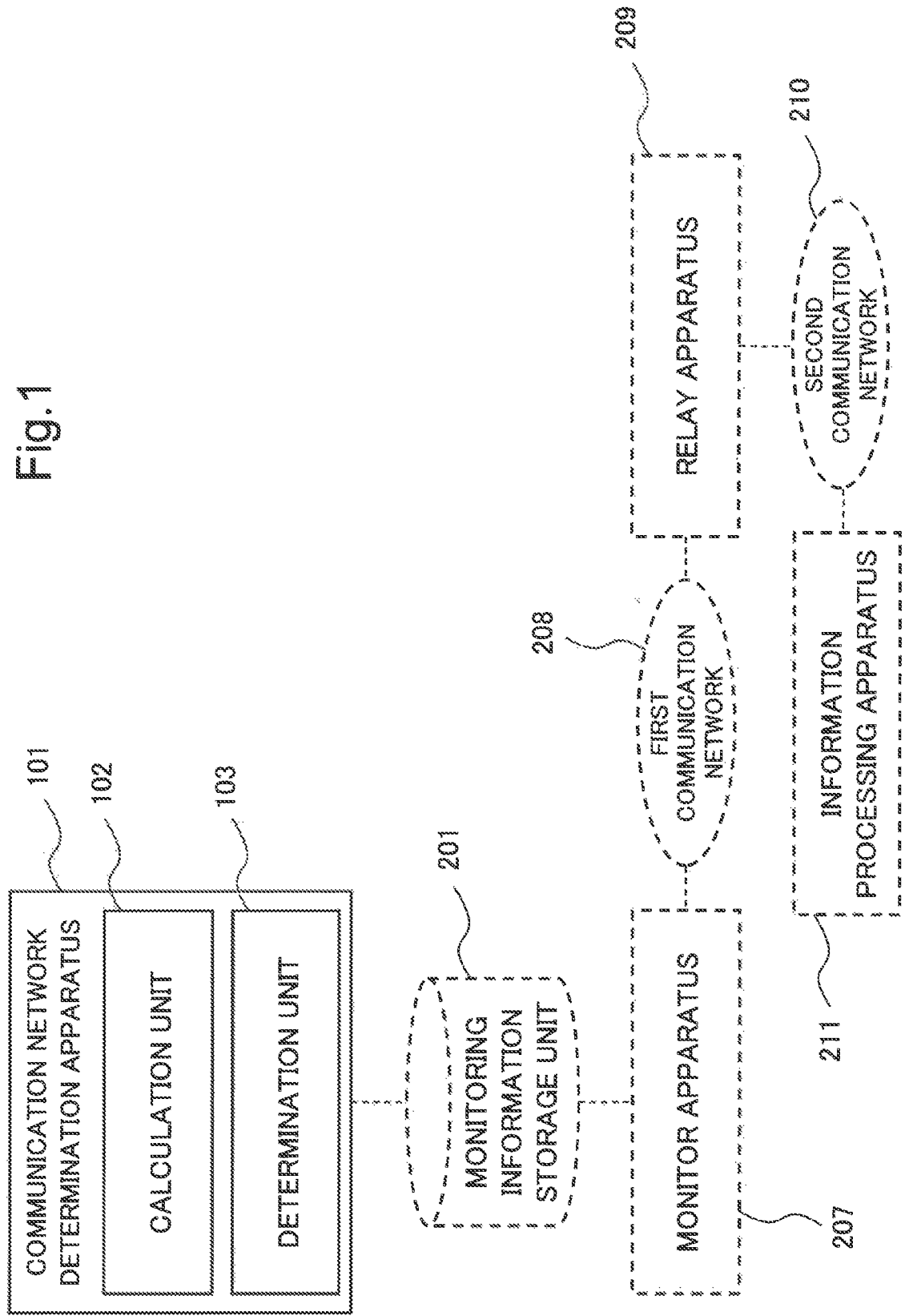
FIG. 1 is a block diagram illustrating a configuration of a communication network determination apparatus according to a first example embodiment of the present invention.

With referent to FIG. 1, a configuration of a communication network determination apparatus 101 according to a first example embodiment of the present invention will be described in detail. FIG. 1 is a block diagram illustrating a configuration of the communication network determination apparatus 101 according to the first example embodiment of the present invention.

The communication network determination apparatus 101 according to the first example embodiment of the present invention includes a calculation unit (calculator) 102 and a determination unit (determiner) 103.

The communication network determination apparatus 101 can refer to a monitoring information storage unit 201 that stores monitoring information (to be described later with reference to FIG. 3). A monitor apparatus 207 reads communication information (communication data) communicated through a first communication network 208 and reads, from the read communication information, an apparatus ID capable of identifying an information processing apparatus having relayed the communication, a communication ID allocated to an information processing apparatus 211 having communicated the information, and the like. It is assumed that the monitor apparatus 207 generates monitoring information (to be described later with reference to FIG. 3) in which the read apparatus ID, the read communication ID, and the like are associated with one another and stores the generated monitoring information in the monitoring information storage unit 201.

With reference to FIG. 3, monitoring information will be described. FIG. 3 is a diagram conceptually illustrating an example of monitoring information stored in the monitoring information storage unit 201.

Monitoring information associates the following items 1 to 3 with one another with regard to a communication performed through the first communication network 208. In other words, these items are Item 1: a time at which the performed communication is detected, Item 2: a communication ID allocated, in a second communication network 210, to an information processing apparatus 211 having performed the communication (represented as a "communication ID" for convenience of description), and Item 3: an apparatus ID capable of identifying an information processing apparatus (represented as a "relay apparatus 209" for convenience of description) having relayed communication information communicated in the second communication network 210 to the first communication network 208.

Monitoring information may further include content information indicating processing relating to performed communication. The information processing apparatus 211 and the relay apparatus 209 may be one information processing apparatus or may be separated information processing apparatuses.

In monitoring information exemplified in FIG. 3, for example, a time "11:12:13", a communication ID "192.168.7.5", and an apparatus ID "44:55:66:77:88:99" are associated with one another. This indicates that the monitor apparatus 207 detects that a communication has been performed at a time "11:12:13". This also indicates that a communication ID allocated to the information processing apparatus 211 in the second communication network 210 is "192.168.7.5". Further, this indicates that an apparatus ID of the relay apparatus 209 is "44:55:66:77:88:99".

Communication information may not necessarily include the above-described items. The above-described apparatus ID is described in a hexadecimal number.

The monitor apparatus 207 reads an apparatus ID and a communication ID from communication information (communication data) communicated through the first communication network 208, generates monitoring information (exemplified in FIG. 3) in which the read apparatus ID and communication ID are associated with each other, and stores the generated monitoring information in the monitoring information storage unit 201. The monitor apparatus 207 may generate monitoring information in which the apparatus ID is further associated with a time at which the communication has been detected.

Figure 2:
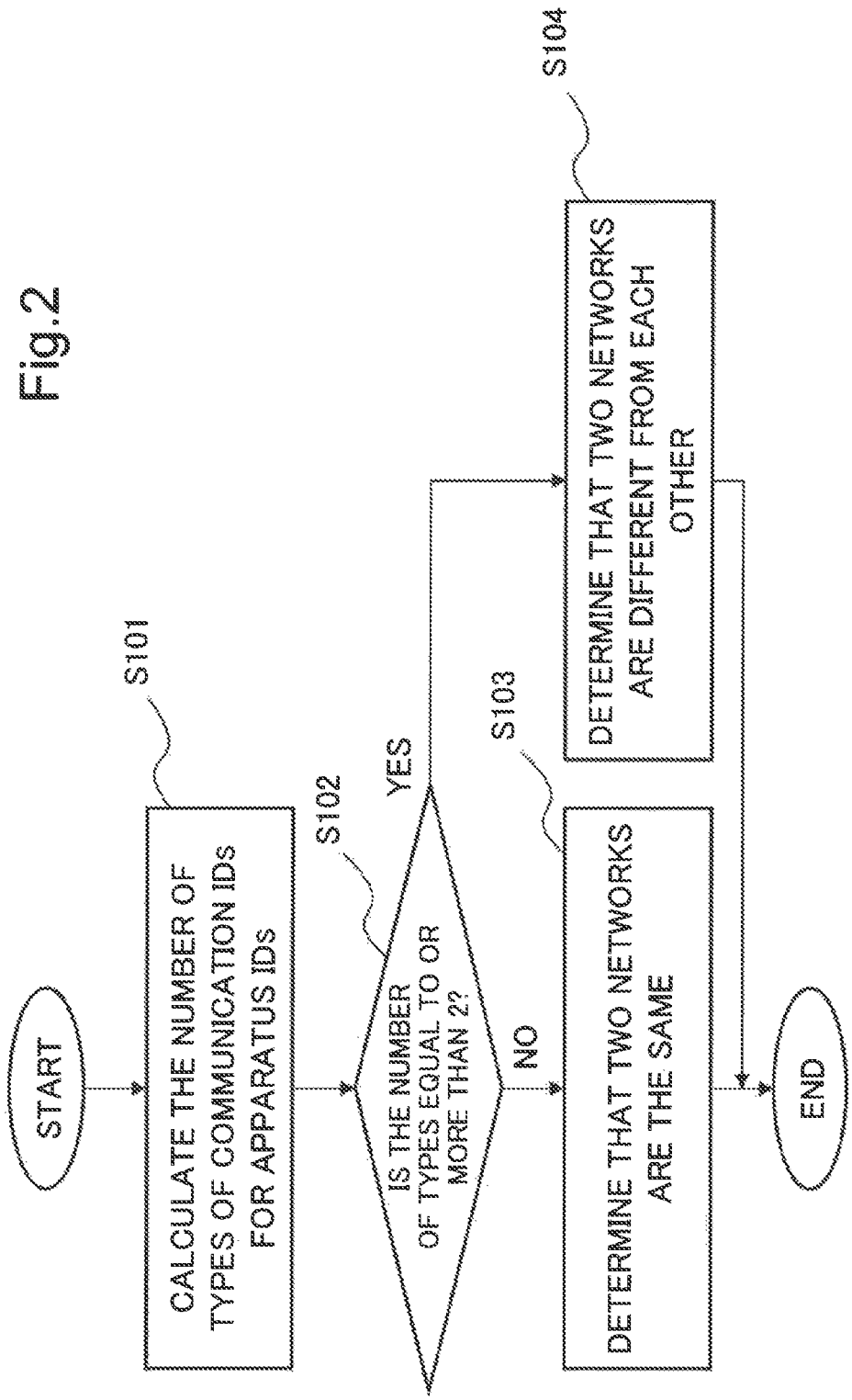
FIG. 2 is a flowchart illustrating a processing flow in the communication network determination apparatus according to the first example embodiment.

Next, with reference to FIG. 2, processing in the communication network determination apparatus 101 according to the first example embodiment of the present invention will be described in detail. FIG. 2 is a flowchart illustrating a processing flow in the communication network determination apparatus 101 according to the first example embodiment.

For convenience of description, it is assumed that the monitoring information storage unit 201 stores monitoring information as described with reference to FIG. 3. However, the communication network determination apparatus 101 may receive monitoring information generated by the monitor apparatus 207 monitoring the first communication network 208.

The calculation unit 102 reads monitoring information stored in the monitoring information storage unit 201. In this case, the calculation unit 102 may read all monitoring information stored in the monitoring information storage unit 201 or may read monitoring information generated during a predetermined period.

The calculation unit 102 reads a communication ID relating to a certain communication and an apparatus ID relating to the communication from the read monitoring information (exemplified in FIG. 3). The calculation unit 102 calculates the number of types of communication IDs associated with the read apparatus ID (step S101).

The determination unit 103 determines whether or not the number of types calculated by the calculation unit 102 is equal to or more than 2 (step S102).

When the number of types is less than 2 (NO in step S102), the determination unit 103 determines that the first communication network 208 and the second communication network 210 are the same (step S103). The first communication network 208 communicably connects to the monitor apparatus 207. The second communication network 210 communicably connects to the information processing apparatus 211 identified by a communication ID. In other words, the determination unit 103 determines that the monitor apparatus 207 monitoring communication in the first communication network 208 and the information processing apparatus 211 having performed a communication in the second communication network 210 communicably connect to the same communication network.

When the number of types is equal to or more than 2 (YES in step S102), the determination unit 103 determines that the first communication network 208 and the second communication network 210 are different from each other (step S104). The first communication network 208 communicably connects to the monitor apparatus 207. The second communication network 210 communicably connects to the information processing apparatus 211 identified by a communication ID. In other words, the determination unit 103 determines that the monitor apparatus 207 monitoring communication in the first communication network 208 and the information processing apparatus 211 having performed a communication in the second communication network 210 communicably connect to different communication networks.

The processing illustrated in FIG. 2 may be executed for all apparatus IDs included in monitoring information (exemplified in FIG. 3) stored in the monitoring information storage unit 201.

Next, an advantageous effect relating to the communication network determination apparatus 101 according to the first example embodiment will be described.

The communication network determination apparatus 101 according to the first example embodiment can accurately specify a communication network monitorable by the monitor apparatus 207 even when it is difficult to necessarily and sufficiently acquire configuration information relating to a configuration of a communication network. The reason is that the communication network determination apparatus 101 determines whether or not the monitor apparatus 207 monitoring the first communication network 208 and the information processing apparatus 211 having performed a communication through the communication network communicably connect to the same communication network. The reason will be described in more detail.

In general, when a monitor apparatus and an information processing apparatus communicably connect to a common communication network, the monitor apparatus can monitor an information processing apparatus through the communication network. However, when a monitor apparatus and an information processing apparatus communicably connect to different communication networks, the monitor apparatus has a difficulty of monitoring an information processing apparatus through the communication network.

When communication connection to different communication networks are established, the information processing apparatus 211 communicates communication information through the relay apparatus 209 (e.g. a gateway) and the first communication network 208. The relay apparatus 209 is configured to perform the relaying between the first communication network 208 and the second communication network 210. Monitoring information (exemplified in FIG. 3) generated by the monitor apparatus 207 includes an apparatus ID of the relay apparatus 209 and a communication ID allocated, in the second communication network 210, to the information processing apparatus 211. Therefore, when a plurality of information processing apparatuses 211 communicably connect to the second communication network 210, the monitor apparatus 207 generates monitoring information in which an apparatus ID of the relay apparatus 209 with a communication ID allocated, in the second communication network 210, to each information processing apparatus are associated with each other. Therefore, in this case, the monitoring information generated during a given period associates an apparatus ID of the relay apparatus 209 with a plurality of types of communication IDs. The communication network determination apparatus 101 determines, when one apparatus ID is associated with a plurality of types of communication IDs, that the first communication network 208 communicably connecting to the monitor apparatus 207 and the second communication network 210 where each communication ID is allocated are different from each other.

In contrast, when the monitor apparatus 207 and the information processing apparatus 211 communicably connect to the same communication network, communication information is communicated without going through the relay apparatus 209. In other words, the relay apparatus 209 and the information processing apparatus 211 indicate one information processing apparatus. In this case, the monitoring information monitored during a given period associates an apparatus ID capable of identifying the relay apparatus 209 (in this case, the information processing apparatus 211) with one type of a communication ID (i.e. one communication ID allocated to the information processing apparatus 211). Therefore, in this case, the monitoring information monitored during a given period associates an apparatus ID indicating the relay apparatus 209 with one communication ID. The communication network determination apparatus 101 determines, when one apparatus ID is associated with one communication ID, that the first communication network communicably connecting to the monitor apparatus 207 and the second communication network 210 communicably connecting to the information processing apparatus 211 are the same.

Therefore, the communication network determination apparatus 101 according to the first example embodiment can specify a communication network monitorable by the monitor apparatus 207.

Second Example Embodiment

Next, a second example embodiment of the present invention based on the above-described first example embodiment will be described.

In the following description, characteristic portions according to the present example embodiment will be mainly described, and a component similar to a corresponding component in the above-described first example embodiment is assigned with the same reference number and thereby overlapping description will be omitted.

Figure 4:
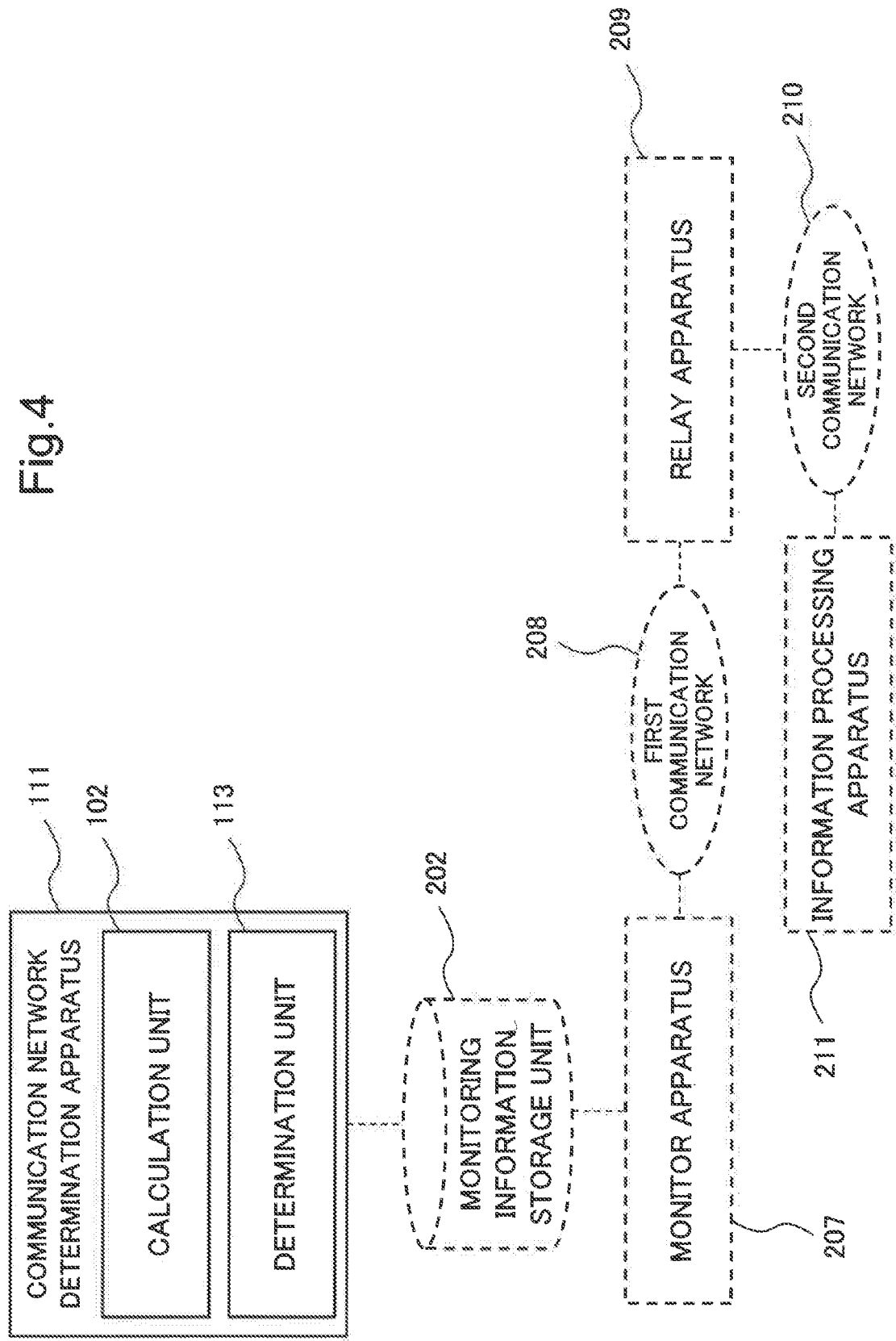
FIG. 4 is a block diagram illustrating a configuration of a communication network determination apparatus according to a second example embodiment of the present invention.

With reference to FIG. 4, a configuration of a communication network determination apparatus 111 according to the second example embodiment of the present invention will be described in detail. FIG. 4 is a block diagram illustrating a configuration of the communication network determination apparatus 111 according to the second example embodiment of the present invention.

The communication network determination apparatus 111 according to the second example embodiment of the present invention includes a calculation unit (calculator) 102 and a determination unit (determiner) 113.

The communication network determination apparatus 111 can refer to a monitoring information storage unit 202 configured to store monitoring information (to be described later with reference to FIG. 6). A monitor apparatus 207 reads communication information (communication data) communicated through a first communication network 208 and reads, from the read communication information, an apparatus ID of an information processing apparatus (represented as a "relay apparatus 209" in this case) having relayed the communication, a communication ID allocated to an information processing apparatus 211, content information indicating processing executed in the communication, and the like. The monitor apparatus 207 generates monitoring information (to be described later with reference to FIG. 6) in which the read apparatus ID, the read communication ID, and the like are associated with one another and stores the generated monitoring information in a monitoring information storage unit 202.

With reference to FIG. 6, monitoring information will be described. FIG. 6 is a diagram conceptually illustrating an example of monitoring information stored in the monitoring information storage unit 202.

The monitoring information associates the following items 4 to 8 with regard to communication transmitted through the first communication network 208. In other words, these items are Item 4: a time when the transmitted communication is detected by the monitor apparatus 207, Item 5: a communication ID (represented as a "communication ID of a transmission source" for convenience of description) allocated, in the second communication network 210, to an information processing apparatus (represented as a "transmission source information processing apparatus" or a "first information processing apparatus" for convenience of description) having transmitted communication information in the communication, Item 6: an apparatus ID (represented as an "apparatus ID of a transmission source" for convenience of description) capable of identifying an information processing apparatus (represented as a "transmission source relay apparatus" or a "second information processing apparatus" for convenience of description) having relayed communication information transmitted in the second communication network 210 to the first communication network 208, Item 7: an apparatus ID (represented as an "apparatus ID of a destination" for convenience of description) capable of identifying an information processing apparatus (represented as a "destination relay apparatus" or a "fourth information processing apparatus" for convenience of description) that relays the communication information to a third communication network, and Item 8: a communication ID (represented as a "communication ID of a destination" for convenience of description) allocated, in the third communication network, to an information processing apparatus (represented as a "destination information processing apparatus" or a "third information processing apparatus" for convenience of description) indicating a destination of communication information.

For example, the above-described item 1 indicates information similar to item 4. Item 2 indicates information similar to item 5 or item 8. Item 3 indicates information similar to item 6 or item 7.

Monitoring information may further include content information indicating processing for a performed communication. A transmission source information processing apparatus and a transmission source relay apparatus may be one information processing apparatus or may be individual information processing apparatuses. A destination information processing apparatus and a destination relay apparatus may be one information processing apparatus or may be individual information processing apparatuses.

The monitoring information exemplified in FIG. 6, for example, associates a time "11:12:13", a communication ID of a transmission source "192.168.7.5:137", and an apparatus ID of a transmission source "44:55:66:77:88:99" with one another. The communication information, further, associates a communication ID of a destination "192.168.7.255", an apparatus ID of a destination "FF:FF:FF:FF:FF:FF", and content information "NetBIOS NameService" with the above-described information. This indicates that a transmitted communication is detected by the monitor apparatus 207 at a time "11:12:13", a communication ID of a transmission source allocated, in the second communication network 210, to the transmission source information processing apparatus is "192.168.7.5", and an apparatus ID of a transmission source indicating a transmission source relay apparatus is "44:55:66:77:88:99". In a communication ID (a communication ID of a transmission source or a communication ID of a destination), a numerical value (e.g. "137") described after ":" indicates a port number. Further, the monitoring information indicates that a transmission source information processing apparatus transmits communication information to a destination information processing apparatus identified by an apparatus ID of a destination "192.168.7.255" through a destination relay apparatus identified by an apparatus ID of a destination "FF:FF:FF:FF:FF:FF". Further, this indicates that the communication information includes content information "NetBIOS NameService".

The above-described apparatus ID (the apparatus ID of a transmission source and the apparatus ID of a destination) is described in a hexadecimal number. In FIG. 6, content information "ARP Which has 192.168.7.254" indicates communication processing for determining an apparatus ID allocated to a communication ID "192.168.7.254". Content information "ARP 192.168.7.254 is EA:34:56:78:E0:53" indicates a communication for notifying that an apparatus ID allocated to a communication ID "192.168.7.254" is EA:34:56:78:E0:53". Content information "GET/HTTP/1.1" indicates a communication for requiring data to a Web server from a Web client in accordance with HTTP version 1.1. Further, content information "OK 200<HTML><BODY>" indicates a communication for, for example, for notifying, for example, that the Web server has successfully received a request transmitted from a Web client and transmits information in accordance with the request to the Web client.

HTTP is an abbreviation of Hypertext Transfer Protocol. HTML is an abbreviation of Hypertext Markup Language.

Communication information may not necessarily include the above-described items. In communication information exemplified in FIG. 6, for example, communication information relating to a communication detected at a time "11:12:15" does not include a communication ID of a transmission source or a communication ID of a destination.

Figure 5:
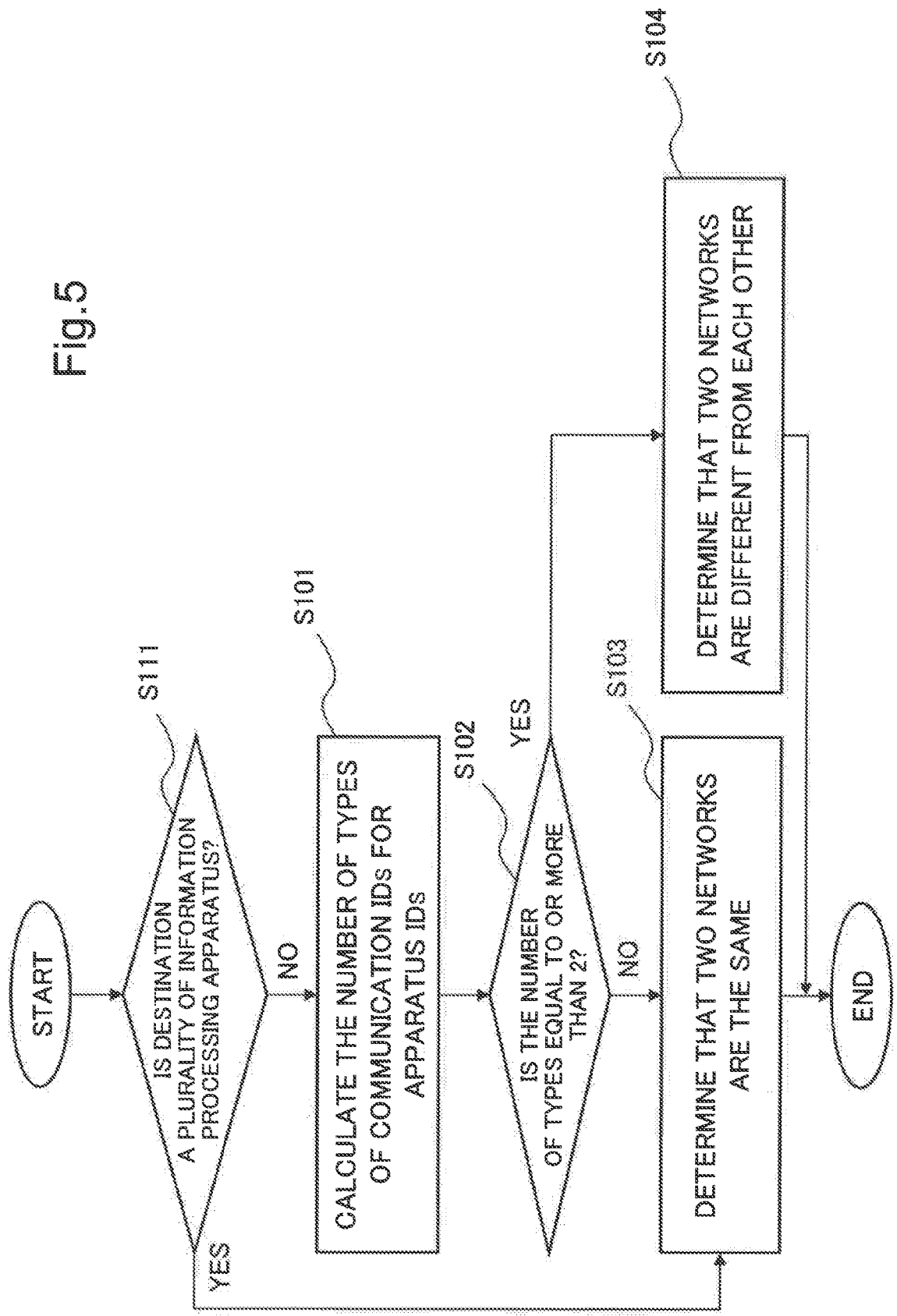
FIG. 5 is a flowchart illustrating a processing flow in the communication network determination apparatus according to the second example embodiment.

For example, with regard to a communication performed in accordance with ARP Protocol, information (data) communicated through a communication network does not include a communication ID of a transmission source or a communication ID of a destination. The communication information is not limited to the above-described example. Further, for example, a packet communicated in accordance with IP protocol includes items 5 to 8 as described above. Further, when a communication ID of a transmission source or a communication ID of a destination includes an IP address and a port number, processing to be described with reference to FIG. 5 is executed for the IP address.

ARP is an abbreviation of Address Resolution Protocol. IP is an abbreviation of Internet Protocol.

The monitor apparatus 207 reads an apparatus ID of a transmission source and an apparatus ID of a destination from communication information (communication data) communicated through the first communication network 208, generates monitoring information in which the read apparatus ID of a transmission source and the read apparatus ID of a destination are associated with each other, and stores the generated monitoring information in the monitoring information storage unit 202. The monitor apparatus 207 may further read a communication ID of a transmission source and a communication ID of a destination from the communication information and generate monitoring information in which the read communication ID of a transmission source, the read communication ID of a destination, and a time at which the communication is detected are further associated with one another.

Next, with reference to FIG. 5, processing in the communication network determination apparatus 111 according to the second example embodiment of the present invention will be described in detail. FIG. 5 is a flowchart illustrating a processing flow in the communication network determination apparatus 111 according to the second example embodiment.

For convenience of description, it is assumed that the monitoring information storage unit 202 has stored the monitoring information exemplified in FIG. 6. However, the communication network determination apparatus 111 may receive monitoring information generated by the monitor apparatus 207.

The calculation unit 102 reads monitoring information stored in the monitoring information storage unit 202. In this case, the calculation unit 102 may read all monitoring information stored in the monitoring information storage unit 202 or may read monitoring information generated during a predetermined period (i.e. monitoring information associated with a time during the predetermined period).

The calculation unit 102 reads the apparatus ID of a destination relating to the certain communication from the read monitoring information (exemplified in FIG. 6). The calculation unit 102 determines whether or not the read apparatus ID of a destination is an apparatus ID indicating a plurality of information processing apparatuses (step S111). The calculation unit 102 determines whether or not the read apparatus ID of a destination is an apparatus ID indicating a plurality of information processing apparatuses, for example, depending on whether or not the apparatus ID of a destination is a predetermined apparatus ID (e.g. "FF:FF:FF:FF:FF:FF").

When the apparatus ID of a destination is an apparatus ID indicating a plurality of information processing apparatuses (YES in step S111), the determination unit 113 determines that the first communication network 208 and the second communication network 210 are the same (step S103). For more specific description, in this case, the determination unit 113 determines that the first communication network 208 where communication information that is a base of monitoring information (exemplified in FIG. 6) has been communicated and the second communication network 210 communicably connecting to a first information processing apparatus identified by a communication ID of a transmission source associated with the apparatus ID of a destination in the monitoring information are the same. In other words, in this case, the determination unit 113 determines that the first information processing apparatus and a second information processing apparatus identified by an apparatus ID of a transmission source associated with the communication ID of a destination communicably connect to the same communication network. In this case, the determination unit 113 may further determine that the first information processing apparatus and the second information processing apparatus are one information processing apparatus.

When the apparatus ID of a destination is not an apparatus ID indicating a plurality of information processing apparatuses (NO in step S111), the communication network determination apparatus 111 executes the processing described in step S101 to step S104 as described with reference to FIG. 2.

Next, an advantageous effect relating to the communication network determination apparatus 111 according to the second example embodiment is described.

The communication network determination apparatus 111 according to the second example embodiment can accurately specify a communication network monitorable by the monitor apparatus 207 even when it is difficult to necessarily and sufficiently acquire configuration information relating to a configuration of a communication network. The reason is similar to the reason described in the first example embodiment.

Further, the communication network determination apparatus 111 may execute processing similar to the processing illustrated in FIG. 2 for a communication ID of a destination and an apparatus ID of a destination. In this case, the communication network determination apparatus 111 can determine whether or not the first communication network 208 communicably connecting to the monitor apparatus 207 and a third communication network communicably connecting to a destination information processing apparatus are the same.

Further, the communication network determination apparatus 111 according to the second example embodiment can accurately specify a communication network monitorable by the monitor apparatus 207. The reason is that received communication information in which an apparatus ID of a destination indicates a plurality of information processing apparatuses represents that an information processing apparatus having transmitted the communication information and an information processing apparatus having received the communication information communicably connect to one communication network. In other words, an information processing apparatus connecting to one communication network cannot receive communication information where an apparatus ID of a destination indicates a plurality of information processing apparatuses in another communication network. Therefore, the second communication network 210 communicably connecting a first information processing apparatus having transmitted the communication information and the first communication network 208 where the communication information has been measured are the same. Therefore, when receiving communication information in which an apparatus ID of a destination indicates a plurality of information processing apparatuses, the communication network determination apparatus 111 determines that the first communication network 208 and the second communication network 210 are the same.

Third Example Embodiment

Next, a third example embodiment of the present invention based on the above-described second example embodiment will be described.

In the following description, characteristic portions according to the present example embodiment will be mainly described, and a component similar to a corresponding component in the above-described second example embodiment is assigned with the same reference number and thereby overlapping description will be omitted.

Figure 7:
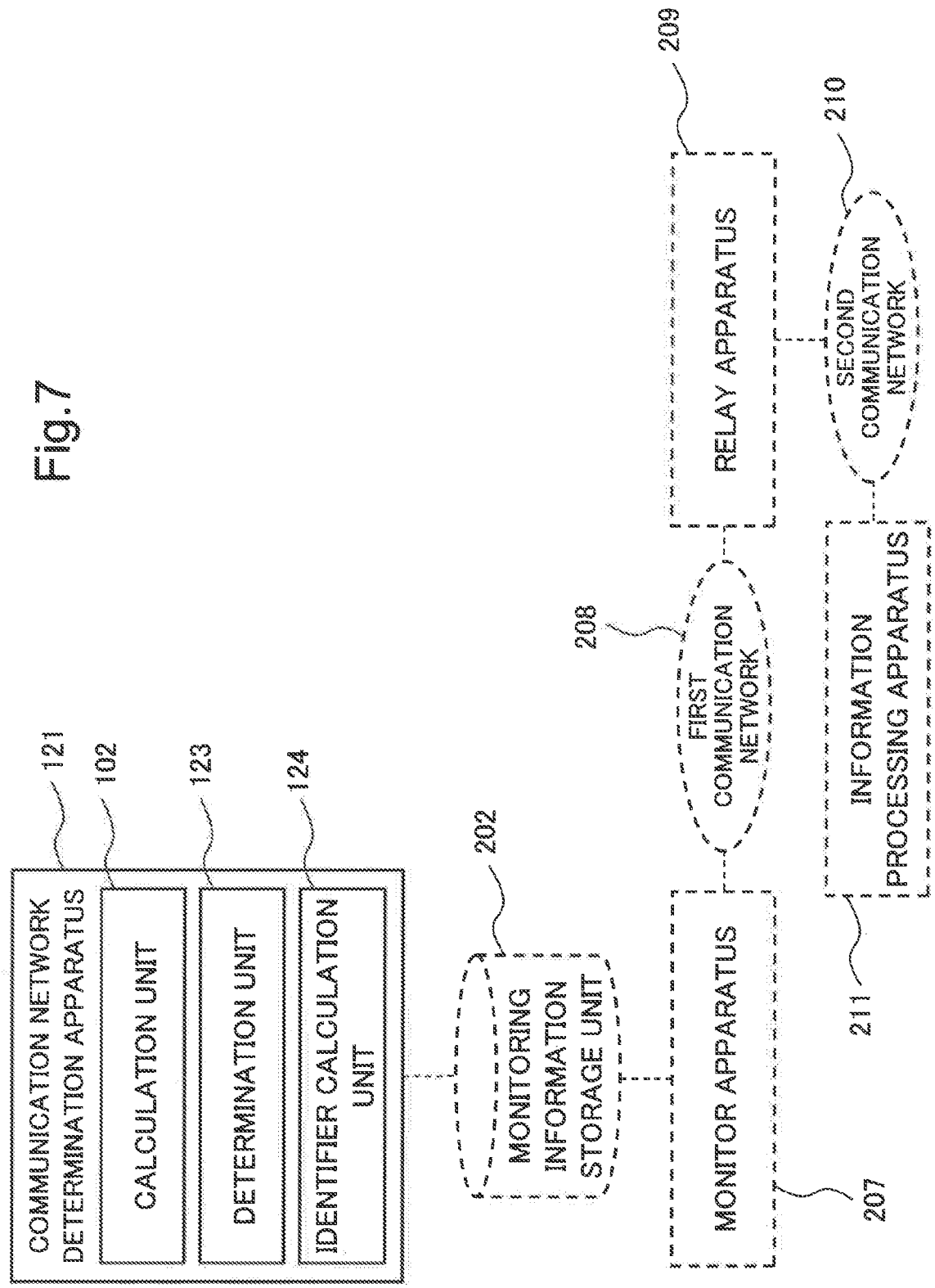
FIG. 7 is a block diagram illustrating a configuration of a communication network determination apparatus according to a third example embodiment of the present invention.

With reference to FIG. 7, a configuration of a communication network determination apparatus 121 according to the third example embodiment of the present invention will be described in detail. FIG. 7 is a block diagram illustrating a configuration of the communication network determination apparatus 121 according to the third example embodiment of the present invention.

The communication network determination apparatus 121 according to the third example embodiment of the present invention includes a calculation unit (calculator) 102, a determination unit (determiner) 123, and an identifier calculation unit (identifier calculator) 124.

The communication network determination apparatus 121 can refer to a monitoring information storage unit 202 that stores monitoring information (exemplified in FIG. 6). A monitor apparatus 207 reads communication information (communication data) communicated through a first communication network 208 and reads, from the read communication information, an apparatus ID capable of identifying a second information processing apparatus (a "relay apparatus 209" in this case) having performed the communication, a communication ID allocated to a first information processing apparatus (an "information processing apparatus 211" in this case), content information indicating processing executed in the communication, and the like. The monitor apparatus 207 generates monitoring information (exemplified in FIG. 6) in which the read apparatus ID, the read communication ID, and the like are associated with one another and stores the generated monitoring information in the monitoring information storage unit 202.

Figure 8:
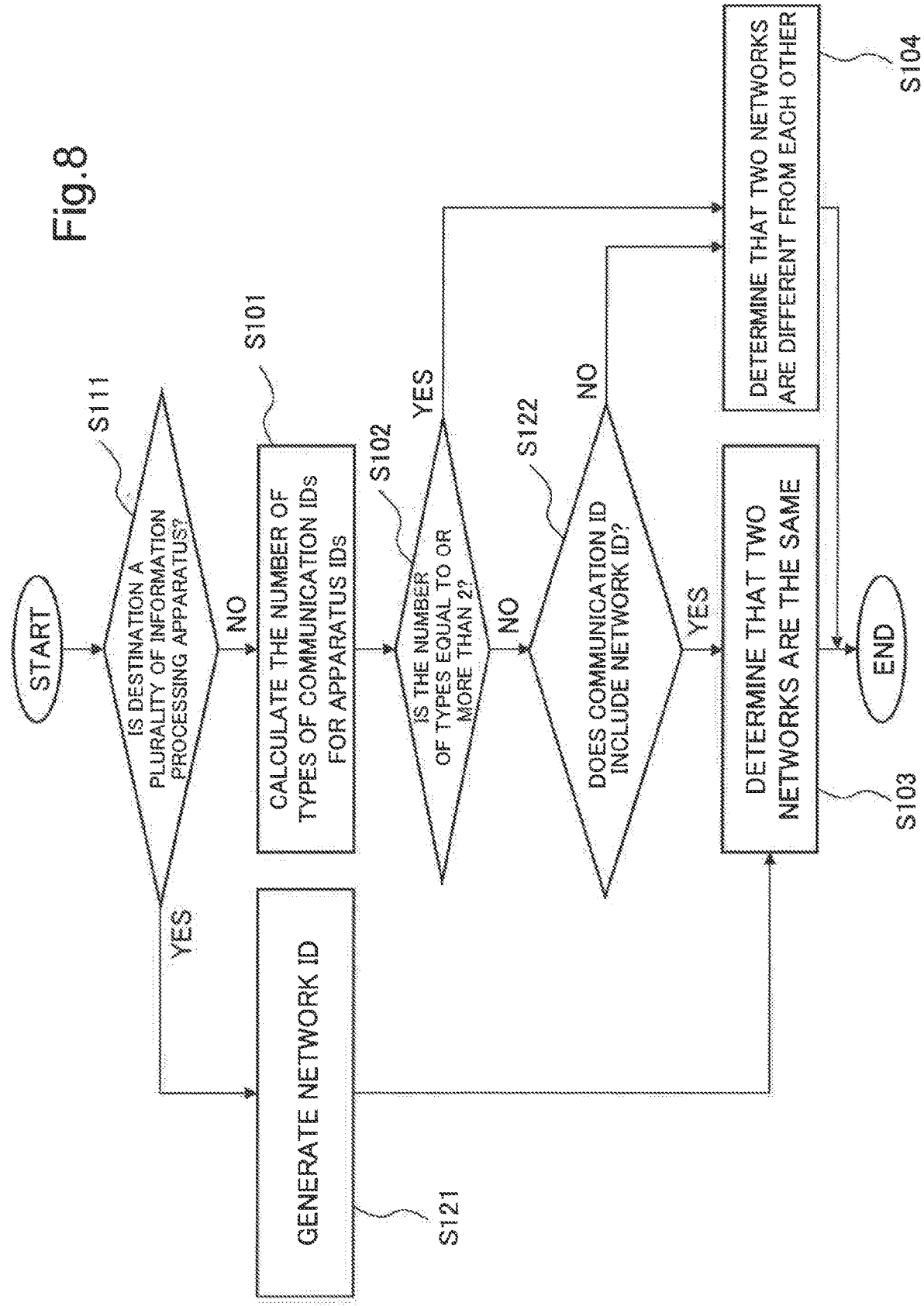
FIG. 8 is a flowchart illustrating a processing flow in the communication network determination apparatus according to the third example embodiment.

Next, with reference to FIG. 8, processing in the communication network determination apparatus 121 according to the third example embodiment of the present invention will be described in detail. FIG. 8 is a flowchart illustrating a processing flow in the communication network determination apparatus 121 according to the third example embodiment.

When an apparatus ID of a destination is an apparatus ID indicating a plurality of information processing apparatuses (YES in step S111), the identifier calculation unit 124 generates a network ID capable of identifying a communication network where communication information has been communicated, based on a communication ID of a destination associated with the apparatus ID of a destination in monitoring information (exemplified in FIG. 6) (step S121). For more specific description, the identifier calculation unit 124 specifies, for example, a predetermined code string indicating a plurality of information processing apparatuses in a code string configuring the communication ID of a destination and specifies, as a network ID, a code string other than the specified predetermined code string. When, for example, a predetermined code string is "255" (i.e. "11111111" in binary number), the identifier calculation unit 124 specifies, as a network ID, a code string "192.168.7" other than a predetermined code string "255" from a code string "192.168.7.255" configuring a communication ID of a destination, with respect to the monitoring information exemplified in FIG. 6. As described above, when communication information in which an apparatus ID of a destination indicates a plurality of information processing apparatuses is received in the first communication network 208, a first information processing apparatus having transmitted the communication information communicably connects to the first communication network 208, and therefore the network ID indicates the first communication network 208.

When an apparatus ID of a destination is not an apparatus ID indicating a plurality of information processing apparatuses (NO in step S111), the calculation unit 102 executes the processing described in step S101 and step S102. The determination unit 123 compares the network ID generated in step S121 and a communication ID in the case of NO in step S102 (step S122). For more specific description, the determination unit 123 determines whether or not, for example, a code string configuring the apparatus ID includes a code string configuring a network ID. When a code string configuring the communication ID includes a code string configuring a network ID, an information processing apparatus identified by the communication ID communicably connects to a communication network identified by the network ID. When a code string configuring the communication ID does not include a code string configuring a network ID, an information processing apparatus identified by the communication ID communicably connects to a communication network other than a communication network identified by the network ID.

When a code string configuring the communication ID includes a code string configuring a network ID (YES in step S122), the determination unit 123 determines that the first communication network 208 and the second communication network 210 are the same communication network (step S103). When a code string configuring the communication ID does not include a code string configuring a network ID (NO in step S122), the determination unit 123 determines that the first communication network 208 and the second communication network 210 are different communication networks (step S104).

When a network ID is not generated, the communication network determination apparatus 121 does not execute the processing described in step S122.

Next, an advantageous effect relating to the communication network determination apparatus 121 according to the third example embodiment will be described.

The communication network determination apparatus 121 according to the third example embodiment can accurately specify a communication network monitorable by the monitor apparatus 207 even when it is difficult to necessarily and sufficiently acquire configuration information relating to a configuration of a communication network. The reason is similar to the reason described in the second example embodiment.

The communication network determination apparatus 121 according to the third example embodiment can more accurately specify a communication network monitorable by the monitor apparatus 207. The reason is that a network ID defines a communication network, and when an apparatus ID of a destination in communication information indicates a plurality of information processing apparatuses, a network ID can be estimated based on the communication ID of a destination. In other words, the communication network determination apparatus 121 determines whether or not a portion other than an ID indicating an information processing apparatus within the communication network in a communication ID indicating an information processing apparatus matches a network ID indicating the communication network with respect to a certain communication network. Based on the determination result, the communication network determination apparatus 121 can determine whether or not the information processing apparatus communicably connects to the communication network.

A communication ID that is a target for which the above-described processing is executed by the communication network determination apparatus 121 may be either a communication ID of a transmission source or a communication ID of a destination in monitoring information (exemplified in FIG. 6).

Fourth Example Embodiment

Next, a fourth example embodiment of the present invention based on the above-described first example embodiment will be described.

In the following description, characteristic portions according to the present example embodiment will be mainly described, and a component similar to a corresponding component in the above-described first example embodiment is assigned with the same reference number and thereby overlapping description will be omitted.

Figure 9:
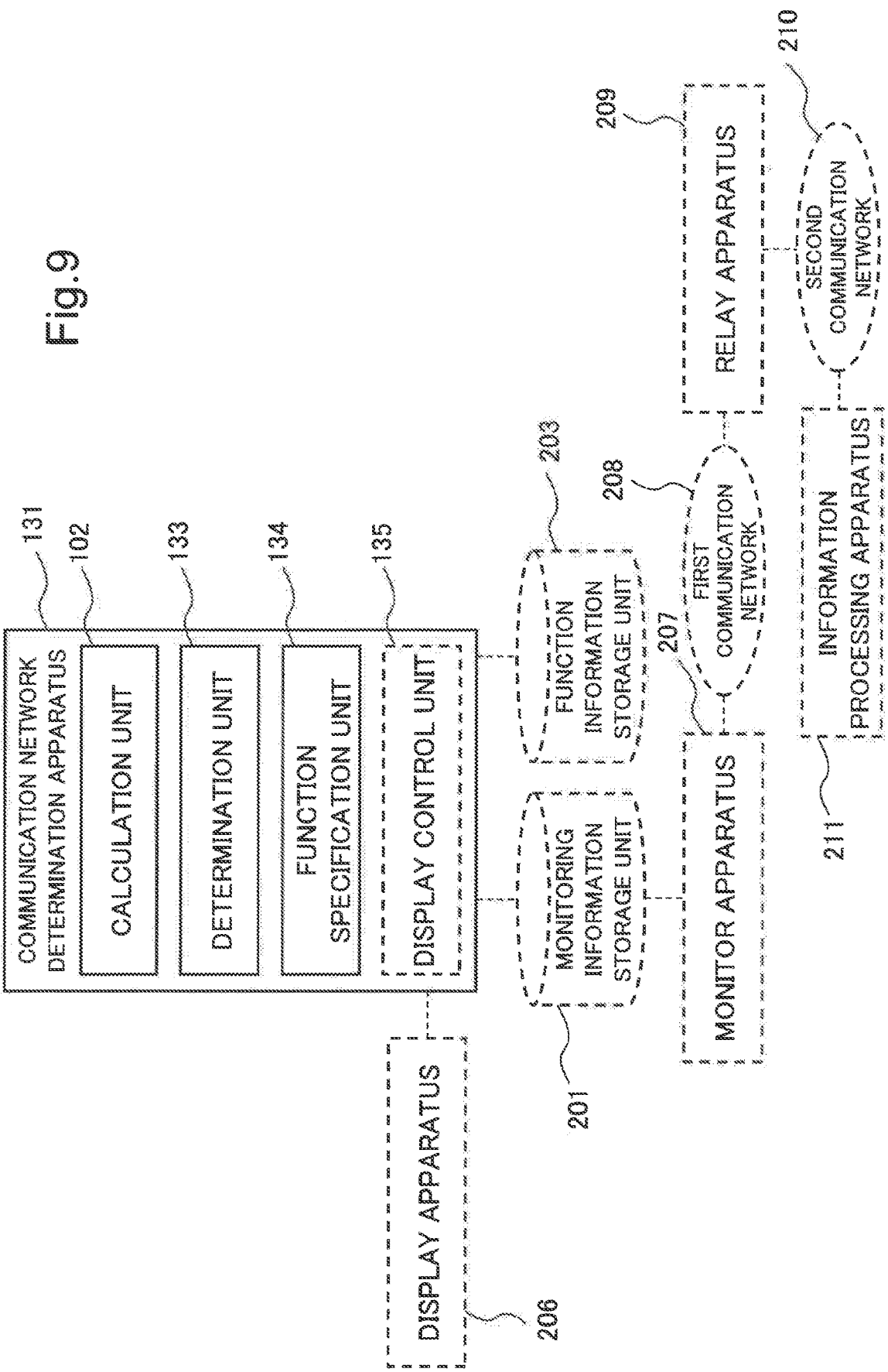
FIG. 9 is a block diagram illustrating a configuration of a communication network determination apparatus according to a fourth example embodiment of the present invention.

With reference to FIG. 9, a configuration of a communication network determination apparatus 131 according to the fourth example embodiment of the present invention will be described in detail. FIG. 9 is a block diagram illustrating a configuration of the communication network determination apparatus 131 according to the fourth example embodiment of the present invention.

The communication network determination apparatus 131 according to the fourth example embodiment of the present invention includes a calculation unit (calculator) 102, a determination unit (determiner) 133, and a function specification unit (function specifier) 134. The communication network determination apparatus 131 further includes a display control unit (display controller) 135.

The communication network determination apparatus 131 can refer to a monitoring information storage unit 201 that stores monitoring information (exemplified in FIG. 3). A monitor apparatus 207 reads communication information (communication data) communicated through a communication network and reads, from the read communication information, an apparatus ID indicating an information processing apparatus (represented as a "relay apparatus 209" in this case) having performed the communication and a communication ID allocated to an information processing apparatus 211. The monitor apparatus 207 generates monitoring information (exemplified in FIG. 3) in which the read apparatus ID and communication ID are associated with each other and stores the generated monitoring information in the monitoring information storage unit 201. The communication network determination apparatus 131 can further refer to a function information storage unit 203 that stores function information (to be described later with reference to FIG. 12). The communication network determination apparatus 131 may connect to a display apparatus 206 or may display a determination result and the like on the display apparatus 206, for example, in accordance with a user interface exemplified in FIG. 14 or FIG. 15.

Next, with reference to FIG. 10, processing in the communication network determination apparatus 131 according to the fourth example embodiment of the present invention will be described in detail. FIG. 10 is a flowchart illustrating a processing flow in the communication network determination apparatus 131 according to the fourth example embodiment.

In the communication network determination apparatus 131, the function specification unit 134 executes processing illustrated in FIG. 10 after execution of processing as described with reference to FIG. 2, FIG. 5, or FIG. 8.

When, for example, determining that a first communication network 208 and a second communication network 210 are different from each other in step S104 illustrated in FIG. 2 (YES in step S131), the function specification unit 134 determines that an information processing apparatus (i.e. a relay apparatus 209) identified by an apparatus ID is a relay apparatus communicably connecting the two different communication networks (step S133). When, for example, determining that the first communication network 208 and the second communication network 210 are the same in step S103 illustrated in FIG. 2 (NO in step S131), the function specification unit 134 determines that an information processing apparatus (i.e. the relay apparatus 209) identified by an apparatus ID is not a relay apparatus communicably connecting the two different communication networks (step S132). In other words, the function specification unit 134 determines whether or not an information processing apparatus identified by an apparatus ID is a relay apparatus communicably connecting two different communication networks depending on a difference between the first communication network 208 and the second communication network 210.

The function specification unit 134 may also executes the processing described with reference to FIG. 10 with respect to the processing described in FIG. 5 or FIG. 8.

Further, the function specification unit 134 may specify a function of an information processing apparatus identified by a communication ID or a function of an information processing apparatus identified by an apparatus ID based on the function information exemplified in FIG. 12. In this case, the communication network determination apparatus 131 specifies the function based on the monitoring information exemplified in FIG. 6. Function information will be described with reference to FIG. 12 and then processing of specifying a function of an information processing apparatus will be described with reference to FIG. 11. FIG. 12 is a diagram conceptually illustrating an example of function information stored in the function information storage unit 203. FIG. 11 is a flowchart illustrating a processing flow in the communication network determination apparatus 131 according to the fourth example embodiment.

The function information exemplified in FIG. 12 associates target information that is a target to be referred to upon specifying a function relating to an information processing apparatus, information indicating determination criteria for the target information, and information indicating a function to be specified when the target information satisfies the determination criteria with one another. The function information exemplified in FIG. 12 associates, for example, a target "a port number of a destination", determination criteria "8080", and a function (a transmission source "Web proxy client" and a destination "Web proxy server") with one another. This indicates that when a port number of a destination included in a communication ID of a destination in monitoring information (exemplified in FIG. 6) is "8080", the function specification unit 134 specifies that a first information processing apparatus identified by a communication ID of a transmission source includes a function of "Web proxy client" and a third information processing apparatus identified by a communication ID of a destination includes a function of "Web proxy server".

Similarly, in the function information exemplified in FIG. 12, a target "content information", determination criteria "GET", and a function (transmission source "Web proxy client" and a destination "Web server") are associated with one another. This indicates that when content information included in monitoring information (exemplified in FIG. 6) includes a code string of "GET" at a top, it is specified that a first information processing apparatus identified by a communication ID of a transmission source includes a function of "Web client" and a third information processing apparatus identified by a communication ID of a destination includes a function of "Web server".

Further, in FIG. 12, SSH represents Secure Shell. SSH is, for example, an instruction for login into an SSH server from an SSH client.

The function information is not limited to the above-described example

Referring to FIG. 11, after processing described in step S132 or step S133, the function specification unit 134 specifies a function relating to an information processing apparatus based on the function information (exemplified in FIG. 12) stored in the function information storage unit 203 (step S134). Step S134 may be processed before step S131.

For more specific description, the function specification unit 134 reads function information in which, for example, a target "a port number of a destination", determination criteria "8080", and a function (a transmission source "Web proxy client" and a destination "Web proxy server") are associated with one another. Next, the function specification unit 134 reads a port number included in a communication ID of a destination from the monitoring information exemplified in FIG. 6 and determines whether or not the read port number matches the determination criteria "8080". When the read port number matches the determination criteria "8080", the function specification unit 134 specifies that a first information processing apparatus identified by a communication ID of a transmission source associated with the communication ID of a destination includes a function of "Web proxy client" and a third information processing apparatus identified by a communication ID of a destination includes a function of "Web proxy server". Also when a target is "content information", the function specification unit 134 specifies a function by executing processing similar to the above-described processing.

The display control unit 135 may show display information (exemplified in FIG. 13) indicating a function specified by the function specification unit 134 on the display apparatus 206. FIG. 13 is a diagram conceptually illustrating an example of the display information. In the display information exemplified in FIG. 13, for example, a communication ID "192.168.7.1" and a function "Web proxy client" are associated with each other. This indicates that an information processing apparatus identified by the communication ID "192.168.7.1" includes a function of "Web proxy client".

The display information is not limited to the above-described example.

The display control unit 135 executes control in such a way as to generate display information in which a communication ID allocated to an information processing apparatus and a function specified by the function specification unit 134 for the information processing apparatus are associated with each other and display the generated display information on the display apparatus 206.

Figure 14:
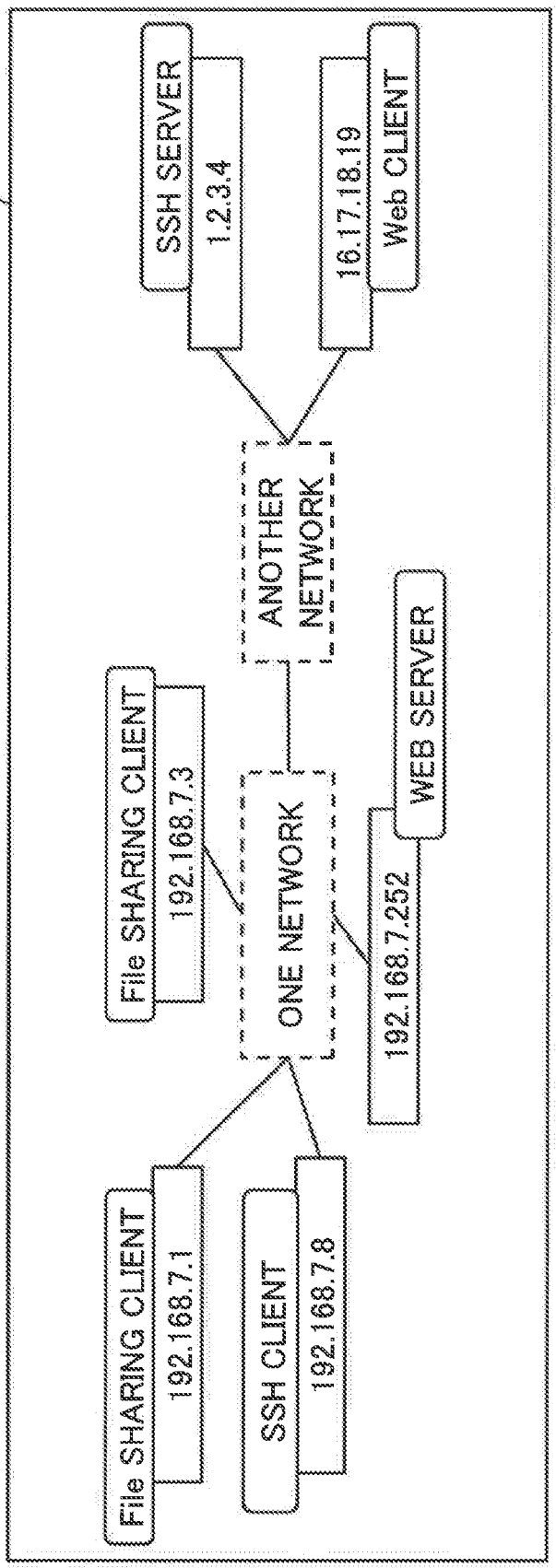
FIG. 14 is a diagram illustrating an example of a user interface.
Figure 15:
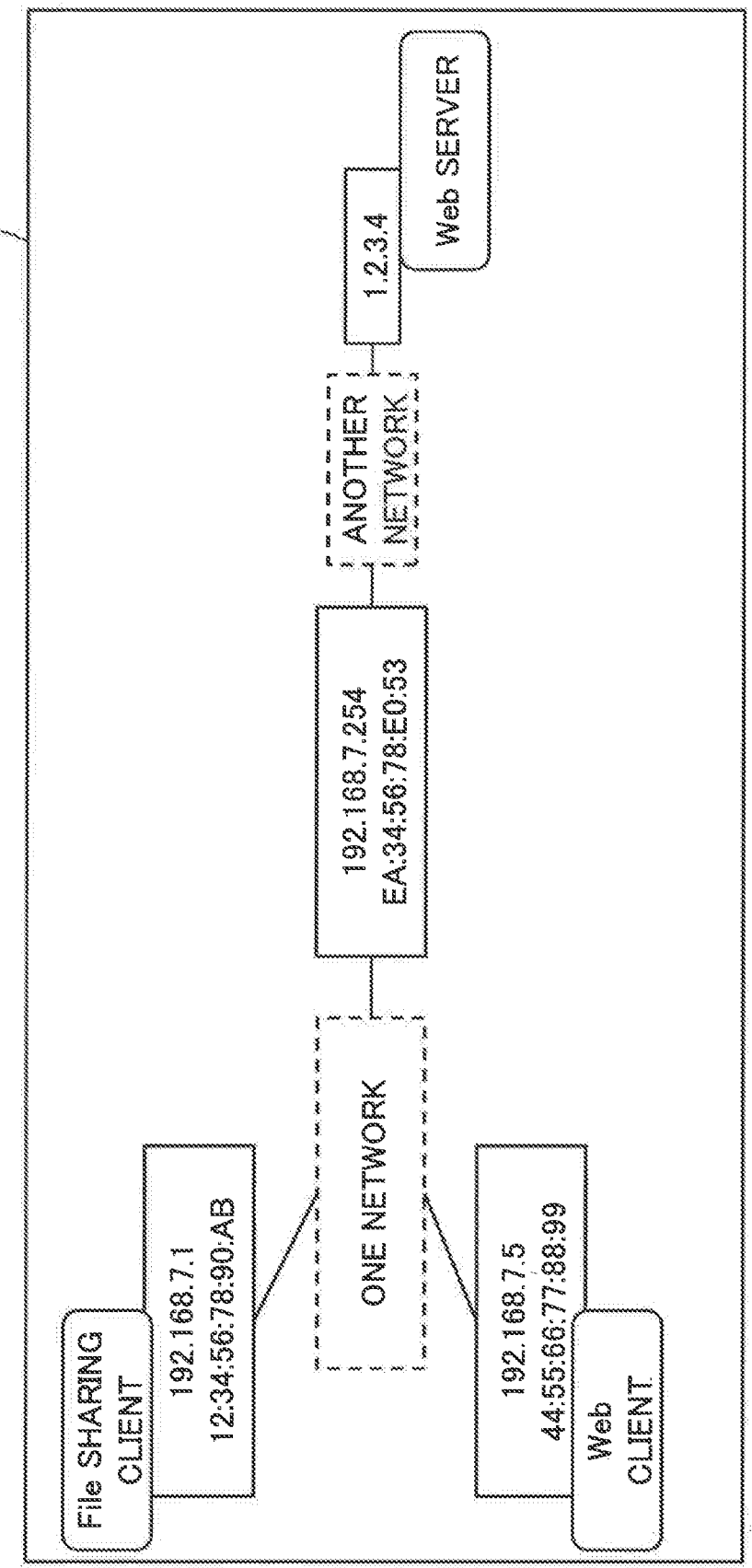
FIG. 15 is a diagram illustrating an example of a user interface.

The display control unit 135 may display a determination result acquired by the determination unit 133 or a function specified by the function specification unit 134, through a user interface as exemplified in FIG. 14 or FIG. 15. FIG. 14 and FIG. 15 each are a diagram illustrating an example of a user interface.

According to a user interface 204 exemplified in FIG. 14, a communication ID identifying an information processing apparatus communicably connecting to a communication network determined as being one and a communication ID identifying an information processing apparatus communicably connecting to a communication network determined as being another are displayed. According to the user interface 204, information indicating a certain communication network and a communication ID identifying an information processing apparatus communicably connecting to the certain communication network are displayed in accordance with a display mode capable of making an association. Referring to FIG. 14, "one network" and a communication ID "192.168.7.252" are displayed in such a way as to be able to be associated with each other, for example, in accordance with a display mode making a connection with a line. This indicates that an information processing apparatus identified by the communication ID "192.168.7.252" communicably connects to a communication network indicated by "one network". Further, an "another network" and a communication ID "1.2.3.4" are displayed in such a way as to be able to be associated with each other, for example, in accordance with a display mode making a connection with a line. This indicates that an information processing apparatus identified by the communication ID "1.2.3.4" communicably connects to a communication network indicated by the "another network".

Further, in the user interface 204 exemplified in FIG. 14, "one network" and an "another network" are further displayed in accordance with a display mode capable of making an association by using a line. When pieces of information indicating two communication networks are displayed in such a way as to be able to be associated with each other, it is indicated that a communication has been performed between the two communication networks. Further, in the user interface 204 exemplified in FIG. 14, a communication ID and a function specified for an information processing apparatus identified by the communication ID are displayed in accordance with a display mode capable of making an association. For example, by a display mode where a communication ID "192.168.7.252" and a function "Web server" are adjacent to each other, the communication ID and the function are displayed in accordance with a display mode capable of making an association. This indicates that an information processing apparatus identified the communication ID "192.168.7.252" has been specified as including the function "Web server".

In a user interface 205 exemplified in FIG. 15, further, "one network" and an "another network" are displayed in accordance with a display mode capable of making an association through a communication ID "192.168.7.254". In FIG. 15, for example, display is performed in accordance with a display mode where a communication ID "192.168.7.254" and "one network" are connected with a line and the communication ID "192.168.7.254" and an "another network" are connected with a line. According to the user interface 205, when an information processing apparatus including a function relating to a relay apparatus that relays a communication between two different communication networks is identified, display is performed in accordance with a display mode where a communication ID identifying the information processing apparatus and information indicating each communication network are associated with each other. In the user interface 205 exemplified in FIG. 15, for example, "one network" and "192.168.7.254" are associated with each other and a "another network" and "192.168.7.254" are associated with each other. This indicates that there are two communication networks and a relay apparatus that relays a communication in the two communication networks is an information processing apparatus identified by the communication ID "192.168.7.254". Further, as exemplified in FIG. 15, an information processing apparatus may be displayed in accordance with a display mode where a communication ID allocated to the information processing apparatus and an apparatus ID indicating the information processing apparatus are displayed.

Next, an advantageous effect relating to the communication network determination apparatus 131 according to the fourth example embodiment is described.

The communication network determination apparatus 131 according to the fourth example embodiment can accurately specify a communication network monitorable by the monitor apparatus 207 even when it is difficult to necessarily and sufficiently acquire configuration information relating to a configuration of a communication network. The reason is similar to the reason described in the first example embodiment.

The communication network determination apparatus 131 according to the fourth example embodiment can further specify a function of an information processing apparatus communicably connecting to a communication network. The reason is that the function specification unit 134 determines whether or not to be a relay apparatus communicably connecting two communication networks. Therefore, the function specification unit 134 specifies whether or not an information processing apparatus is a relay apparatus communicably connecting two different communication networks and thereby can specify a function of the information processing apparatus communicably connecting to a communication network.

Further, the communication network determination apparatus 131 according to the fourth example embodiment can specify a function of an information processing apparatus communicably connecting to a communication network in more detail. The reason is that a program using a port number may already be determined according to the port number. And, a port number is managed, for example, by Internet Assigned Numbers Authority (IANA) that manages a port number relating to a communication network. When a program using a port number is already determined, the communication network determination apparatus 131 specifies a function of an information processing apparatus that executes a communication in accordance with the program by using the port number.

Further, the communication network determination apparatus 131 according to the fourth example embodiment enables easy specification of a range being monitored by the monitor apparatus 207. The reason is that a display mode depending on a difference between the first communication network 208 and the second communication network 210 is displayed.

According to the communication network determination apparatus 131 according to the fourth example embodiment, a relay apparatus communicably connecting two different communication networks can be easily specified. The reason is that an information processing apparatus communicably connecting two communication networks is displayed.

According to the communication network determination apparatus 131 according to the fourth example embodiment, a function of an information processing apparatus can be easily specified. The reason is that the display control unit 135 displays, on the display apparatus 206, a function specified as being included in an information processing apparatus, in accordance with a display mode associated with a communication ID allocated to the information processing apparatus.

(Hardware Configuration Example)

A configuration example of hardware resources that achieve a communication network determination apparatus according to each example embodiment of the present invention will be described. However, the communication network determination apparatus may be achieved using physically or functionally at least two calculation processing apparatuses. Further, the communication network determination apparatus may be achieved as a dedicated apparatus.

Figure 16:
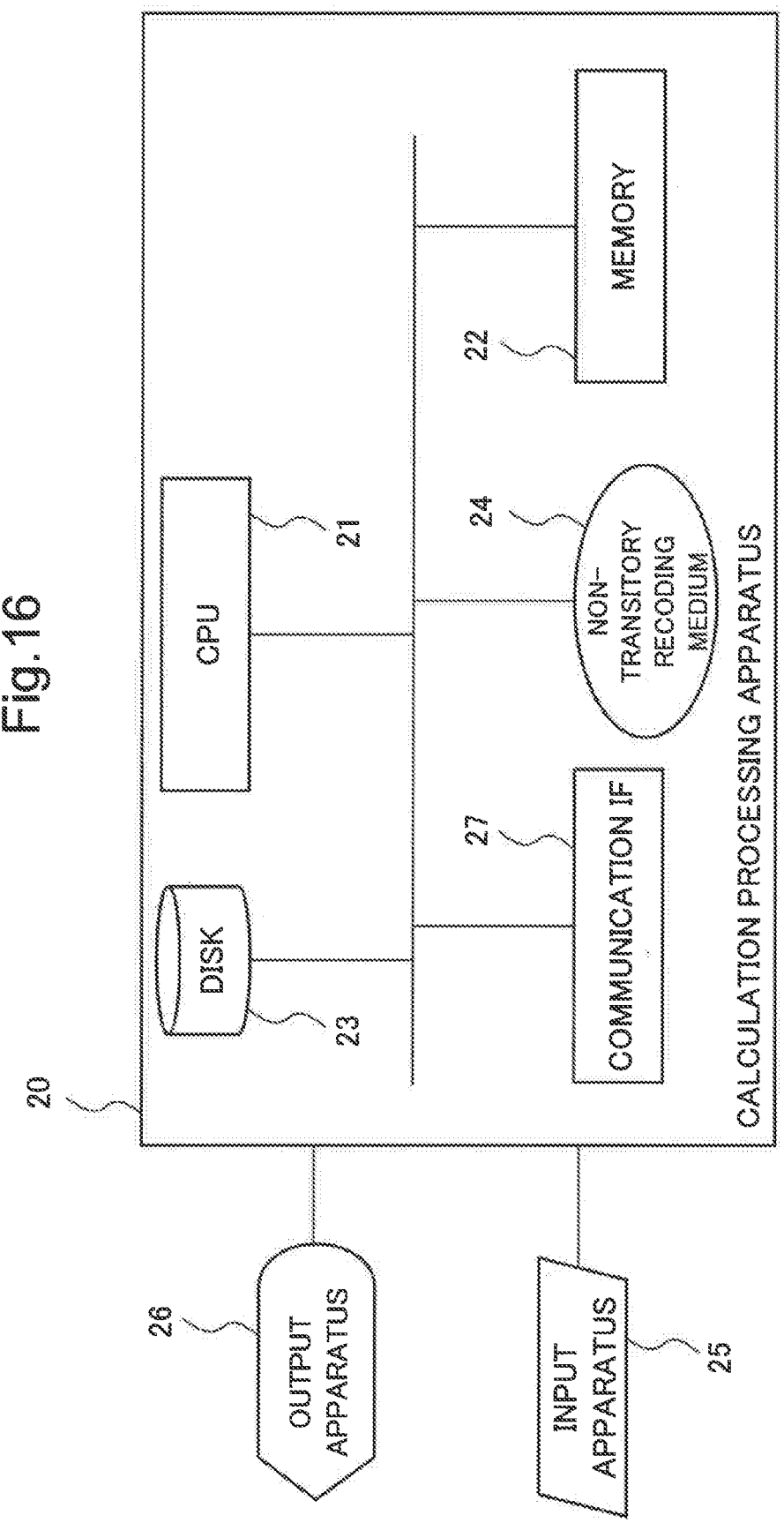
FIG. 16 is a block diagram schematically illustrating a hardware configuration of a calculation processing apparatus capable of achieving communication network determination apparatus according to each example embodiments of the present invention.

FIG. 16 is a block diagram schematically illustrating a hardware configuration of a calculation processing apparatus capable of achieving communication network determination apparatus according to the first to fourth example embodiments of the present invention. A calculation processing apparatus 20 includes a central processing unit (CPU) 21, a memory 22, a disk 23, a non-transitory recording medium 24, and a communication interface (hereinafter, expressed as. "communication I/F") 27. The calculation processing apparatus 20 may connect an input apparatus 25 and an output apparatus 26. The calculation processing apparatus 20 can execute transmission/reception of information to/from another calculation processing apparatus and a communication apparatus via the communication I/F 27.

The non-transitory recording medium 24 is, for example, a computer-readable Compact Disc or Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored in the disk 23 when executing the program and executes arithmetic processing. The CPU 21 reads data necessary for program execution from the memory 22. When display is needed, the CPU 21 displays an output result on the output apparatus 26. When a program is input from the outside, the CPU 21 reads the program from the input apparatus 25. The CPU 21 interprets and executes a communication network determination program (FIG. 2, FIG. 5, FIG. 8, FIG. 10, or FIG. 11) present on the memory 22 corresponding to a function (processing) indicated by each unit illustrated in FIG. 1, FIG. 4, FIG. 7, or FIG. 9 described above. The CPU 21 sequentially executes the processing described in each example embodiment of the present invention.

In other words, in such a case, it is conceivable that the present invention can also be made using the communication network determination program. Further, it is conceivable that the present invention can also be made using a computer-readable, non-transitory recording medium storing the communication network determination program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

A part of or all of the above-described example embodiments may be described as the following supplementary notes. However, the present invention exemplarily described in the above-described example embodiments is not limited to the following.

(Supplementary Note 1)

A communication network determination apparatus comprising:

calculation means for calculating a number of types of communication identifier associated with an apparatus identifier of a second information apparatus in monitoring information where a communication identifier allocated to a first information apparatus in a second communication network and an apparatus identifier of a second information apparatus that relays a communication in a first communication network, the monitoring information generated based on communication network via the first communication network; and determination means for determining that the first communication network is the same as the second communication network when the calculated number of types is one, and determining that the first communication network is different from the second communication network when the calculated number of types is two or more.

(Supplementary Note 2)

The communication network determination apparatus according to supplementary note 1, wherein the monitoring information includes a destination communication identifier of a third information apparatus in a third communication network and a determination apparatus identifier of a fourth information apparatus that relays communication to the third information processing apparatus in association with each other, the third information apparatus being a destination communicated by the first information apparatus, and the determination means determines that the first communication network is the same as the second communication network when the destination apparatus identifier indicates a plurality of information apparatuses.

(Supplementary Note 3)

The communication network determination apparatus according to 2 further comprising:

identifier generation means for generating a network identifier configured to determine communicably connectability to the first communication network based on the destination communication identifier when the destination apparatus identifier indicates a plurality of information processing apparatuses, wherein the determination means determines whether or not the first information processing apparatus identified by the communication identifier in the monitoring information is able to communicably connect to the first communication network, determines that the first communication network is the same as the second communication network when determining that the first information apparatus is able to communicably connect to the first communication network, and determines that the first communication network and the second communication network are different from each other, otherwise.

(Supplementary Note 4)

The communication network determination apparatus according to supplementary note 2 further comprising:

identifier generation means for generating network identifier to determine communicable connectability to the first communication network based on the destination communication identifier when the determination apparatus identifier indicates a plurality of information processing apparatuses, wherein the determination means determines whether or not the third information apparatus identified by the destination communication identifier in the monitoring information is able to communicably connect to the first communication network, determines that the third communication network is the same as the second communication network when determining communicably connection is possible, and determine that the third communication network is different from the second communication network, otherwise.

(Supplementary Note 5)

The communication network determination apparatus according to any one of supplementary notes 1 to 4 further comprising:

function specification means for specifying the second information processing apparatus as a relay apparatus communicably connecting between the first communication network and the second communication network different from the first communication network.

(Supplementary Note 6)

The communication network determination apparatus according to any one of supplementary notes 2 to 4 further comprising:

function specification means for specifying the fourth information processing apparatus as a relay apparatus connecting between the second communication network and the third communication network different from the second communication network when determining that the third communication network is different from the second communication network.

(Supplementary Note 7)

The communication network determination apparatus according to supplementary note 6, wherein the monitoring information includes a port number for identifying a program executed in the third information processing apparatus in association with the communication identifier allocated to the first information apparatus, wherein the function specification means specifies a function of the first information apparatus or a function of the third information apparatus based on the port number.

(Supplementary Note 8)

The communication network determination apparatus according to supplementary note 6, wherein the monitoring information includes processing content indicating processing for the communication in association with the communication identifier allocated to the first information apparatus, and the function specification means specifies a function of the first information processing apparatus or a function of the third information processing apparatus based on code sequence included in the processing content.

(Supplementary Note 9)

The communication network determination apparatus according to any one of supplementary notes 1 to 7 further comprising:

display control means for controlling a user interface to display the communication identifier included in the monitoring information in accordance with a display mode depending on determined difference between the first communication network and the second communication network.

(Supplementary Note 10)

The communication network determination apparatus according to any one of supplementary notes 5 to 8 further comprising:

display control means for controlling a user interface to display the communication identifier in the monitoring information in accordance with a display mode depending on the determined difference between the first communication network and the second communication network, the display mode being a mode where a communication network determined to be the same, a communication network determined to be different, and the communication identifier allocated to information apparatus determined to be a relay apparatus connecting communication networks are connected with each other.

(Supplementary Note 11)

The communication network determination apparatus according to supplementary note 7 or supplementary note 8 further comprising display control means for controlling a user interface to display the communication identifier in the monitoring information in accordance with a display mode depending on the determined difference between the first communication network and the second communication network, the display mode associating the specified function for an information processing apparatus identified by the communication identifier with the communication identifier.

(Supplementary Note 12)

A communication network determination method comprising:

calculating a number of types of communication identifier associated with an apparatus identifier of a second information apparatus in monitoring information where a communication identifier allocated to a first information apparatus in a second communication network and an apparatus identifier of a second information apparatus that relays a communication in a first communication network, the monitoring information generated based on communication network via the first communication network; and determining that the first communication network is the same as the second communication network when the calculated number of types is one, and determining that the first communication network is different from the second communication network when the calculated number of types is two or more.

(Supplementary Note 13)

A recording medium storing a communication network determination program, the program making a computer achieve:

a calculation function for calculating a number of types of communication identifier associated with an apparatus identifier of a second information apparatus in monitoring information where a communication identifier allocated to a first information apparatus in a second communication network and an apparatus identifier of a second information apparatus that relays a communication in a first communication network, the monitoring information generated based on communication network via the first communication network; and a determination function for determining that the first communication network is the same as the second communication network when the calculated number of types is one, and determining that the first communication network is different from the second communication network when the calculated number of types is two or more.

REFERENCE SIGNS LIST 101 communication network determination apparatus
102 calculation unit
103 determination unit
201 monitoring information storage unit
207 monitor apparatus
208 first communication network
209 relay apparatus
210 second communication network
211 information processing apparatus
111 communication network determination apparatus
202 monitoring information storage unit
121 communication network determination apparatus
123 determination unit
124 identifier calculation unit
131 communication network determination apparatus
133 determination unit
134 function specification unit
135 display control unit
203 function information storage unit
206 display apparatus
204 user interface
205 user interface
20 calculation processing apparatus
21 CPU
22 memory
23 disk
24 non-transitory recoding medium
25 input apparatus
26 output apparatus
27 communication IF

The invention claimed is:

1. A communication network determination apparatus comprising:
    a memory storing instructions; and
    a processor connected to the memory and configured to execute the instructions to:
        calculate a number of types of communication identifier associated with an apparatus identifier of a second information processing apparatus in monitoring information where a communication identifier allocated to a first information processing apparatus in a second communication network and an apparatus identifier of the second information processing apparatus that relays a communication in a first communication network, the monitoring information generated based on communication network via the first communication network; and
        determine that the first communication network is the same as the second communication network when the destination apparatus identifier indicates a plurality of information processing apparatuses, and determine that the first communication network is different from the second communication network when the destination apparatus identifier does not indicate a plurality of information processing apparatuses, wherein
    the monitoring information includes a destination communication identifier of a third information processing apparatus in a third communication network and a determination apparatus identifier of a fourth information processing apparatus that relays communication to the third information processing apparatus in association with each other, the third information processing apparatus being a destination communicated by the first information processing apparatus.

2. The communication network determination apparatus according to claim 1, wherein
    the processor is configured to execute the instructions to generate a network identifier configured to determine communicably connectability to the first communication network based on the destination communication identifier when the destination apparatus identifier indicates a plurality of information processing apparatuses, determine whether or not the first information processing apparatus identified by the communication identifier in the monitoring information is able to communicably connect to the first communication network, determine that the first communication network is the same as the second communication network when determining that the first information processing apparatus is able to communicably connect to the first communication network, and determine that the first communication network and the second communication network are different from each other, otherwise.

3. The communication network determination apparatus according to claim 1, wherein
    the processor is configured to execute the instructions to generate network identifier to determine communicable connectability to the first communication network based on the destination communication identifier when the determination apparatus identifier indicates a plurality of information processing apparatuses, determine whether or not the third information processing apparatus identified by the destination communication identifier in the monitoring information is able to communicably connect to the first communication network, determine that the third communication network is the same as the second communication network when determining communicably connection is possible, and determine that the third communication network is different from the second communication network, otherwise.

4. The communication network determination apparatus according to claim 1, wherein
    the processor is configured to execute the instructions to specify the second information processing apparatus as a relay apparatus communicably connecting between the first communication network and the second communication network different from the first communication network.

5. The communication network determination apparatus according to claim 1, wherein
    the processor is configured to execute the instructions to specify the fourth information processing apparatus as a relay apparatus connecting between the second communication network and the third communication network different from the second communication network when determining that the third communication network is different from the second communication network.

6. The communication network determination apparatus according to claim 5, wherein
    the monitoring information includes a port number for identifying a program executed in the third information processing apparatus in association with the communication identifier allocated to the first information processing apparatus, an the processor is configured to execute the instructions to
specify a function of the first information processing apparatus or a function of the third information processing apparatus based on the port number.

7. The communication network determination apparatus according to claim 5, wherein
the monitoring information includes processing content indicating processing for the communication in association with the communication identifier allocated to the first information processing apparatus, and
the processor is configured to execute the instructions to specify a function of the first information processing apparatus or a function of the third information processing apparatus based on code sequence included in the processing content.

8. The communication network determination apparatus according to claim 1, wherein
the processor is configured to execute the instructions to control a user interface to display the communication identifier included in the monitoring information in accordance with a display mode depending on determined difference between the first communication network and the second communication network.

9. The communication network determination apparatus according to claim 4, wherein
the processor is configured to execute the instructions to control a user interface to display the communication identifier in the monitoring information in accordance with a display mode depending on the determined difference between the first communication network and the second communication network, the display mode being a mode where a communication network determined to be the same, a communication network determined to be different, and the communication identifier allocated to information processing apparatus determined to be a relay apparatus connecting communication networks are connected with each other.

10. The communication network determination apparatus according to claim 6, wherein
the processor is configured to execute the instructions to control a user interface to display the communication identifier in the monitoring information in accordance with a display mode depending on the determined difference between the first communication network and the second communication network, the display mode associating the specified function for an information processing apparatus identified by the communication identifier with the communication identifier.

11. A communication network determination method comprising:
calculating a number of types of communication identifier associated with an apparatus identifier of a second information processing apparatus in monitoring information where a communication identifier allocated to a first information processing apparatus in a second communication network and an apparatus identifier of a second information processing apparatus that relays a communication in a first communication network, the monitoring information generated based on communication network via the first communication network; and
determining that the first communication network is the same as the second communication network when the destination apparatus identifier indicates a plurality of information processing apparatuses, and determining that the first communication network is different from the second communication network when the destination apparatus identifier does not indicate a plurality of information processing apparatuses, wherein
the monitoring information includes a destination communication identifier of a third information processing apparatus in a third communication network and a determination apparatus identifier of a fourth information processing apparatus that relays communication to the third information processing apparatus in association with each other, the third information processing apparatus being a destination communicated by the first information processing apparatus.

12. A non-transitory recording medium storing a communication network determination program, the program making a computer achieve:
a calculation function configured to calculate a number of types of communication identifier associated with an apparatus identifier of a second information processing apparatus in monitoring information where a communication identifier allocated to a first information processing apparatus in a second communication network and an apparatus identifier of a second information processing apparatus that relays a communication in a first communication network, the monitoring information generated based on communication network via the first communication network; and
a determination function configured to determine that the first communication network is the same as the second communication network when the destination apparatus identifier indicates a plurality of information processing apparatuses, and determine that the first communication network is different from the second communication network when the destination apparatus identifier does not indicate a plurality of information processing apparatuses, wherein
the monitoring information includes a destination communication identifier of a third information processing apparatus in a third communication network and a determination apparatus identifier of a fourth information processing apparatus that relays communication to the third information processing apparatus in association with each other, the third information processing apparatus being a destination communicated by the first information processing apparatus.

\* \* \* \* \*

UNITED STATES PATENT AND TRADEMARK OFFICE
CERTIFICATE OF CORRECTION

PATENT NO. : 10,862,759 B2  
APPLICATION NO. : 16/312428  
DATED : December 8, 2020  
INVENTOR(S) : Masato Yamane and Yuki Ashino Page 1 of 1

It is certified that error appears in the above-identified patent and that said Letters Patent is hereby corrected as shown below:

In the Claims

Column 24, Line 67; In Claim 6, delete "an" and insert --and-- therefor

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*